United States Patent
Tran et al.

(10) Patent No.: US 10,585,887 B2
(45) Date of Patent: Mar. 10, 2020

(54) MULTI-SYSTEM QUERY EXECUTION PLAN

(71) Applicant: ORACLE INTERNATIONAL CORPORATION, Redwood Shores, CA (US)

(72) Inventors: Khai Tran, San Mateo, CA (US); Rajkumar Sen, San Mateo, CA (US); Sabina Petride, Tracy, CA (US); Sam Idicula, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 530 days.

(21) Appl. No.: 14/673,560

(22) Filed: Mar. 30, 2015

(65) Prior Publication Data
US 2016/0292167 A1  Oct. 6, 2016

(51) Int. Cl.
*G06F 7/00* (2006.01)
*G06F 17/30* (2006.01)
*G06F 16/2453* (2019.01)

(52) U.S. Cl.
CPC .................. *G06F 16/24542* (2019.01)

(58) Field of Classification Search
CPC .............. G06F 17/30463; G06F 9/5066; G06F 16/24542; G06F 17/30082; G06F 17/30442

(Continued)

(56) References Cited

U.S. PATENT DOCUMENTS

| | | | |
|---|---|---|---|
| 4,769,772 A | 9/1988 | Dwyer | |
| 4,829,427 A | 5/1989 | Green | |

(Continued)

OTHER PUBLICATIONS

Ramez Elmasri and Shamkant B. Navathe. Fundamentals of Database Systems, third edition. Addison Wesley, New York, 2000, Chapter 18, pp. 585-628.*

(Continued)

*Primary Examiner* — Md I Uddin
(74) *Attorney, Agent, or Firm* — Hickman Palermo Becker Bingham LLP

(57) ABSTRACT

Techniques are described to evaluate an operation from an execution plan of a query to offload the operation to another database management system for less costly execution. In an embodiment, the execution plan is determined based on characteristics of the database management system that received the query for execution. One or more operations in the execution plan are then evaluated for offloading to another heterogeneous database management system. In a related embodiment, the offloading cost for each operation may also include communication cost between the database management systems. The operations that are estimated to be less costly to execute on the other database management system are then identified for offloading to the other database management system. In an alternative embodiment, the database management system generates permutations of execution plans for the same query, and similarly evaluates each permutation of the execution plans for offloading its one or more operations. Based on the total cost of each permutation, which may include offloading cost for one or more operations to another database management system, the least costly plan is selected for the query execution.

28 Claims, 10 Drawing Sheets

(58) Field of Classification Search
USPC .................................... 707/718, 736, 737
See application file for complete search history.

(56) References Cited

U.S. PATENT DOCUMENTS

| | | | |
|---|---|---|---|
| 5,091,852 A | 2/1992 | Tsuchida et al. | |
| 5,325,525 A | 6/1994 | Shan et al. | |
| 5,339,429 A | 8/1994 | Tanaka et al. | |
| 5,412,804 A | 5/1995 | Krishna | |
| 5,437,032 A | 7/1995 | Wolf et al. | |
| 5,452,468 A | 9/1995 | Peterson | |
| 5,495,419 A | 2/1996 | Rostoker et al. | |
| 5,495,605 A | 2/1996 | Cadot | |
| 5,495,606 A | 2/1996 | Borden et al. | |
| 5,537,588 A | 7/1996 | Engelmann et al. | |
| 5,548,755 A | 8/1996 | Leung et al. | |
| 5,551,027 A | 8/1996 | Choy et al. | |
| 5,574,900 A | 11/1996 | Huang et al. | |
| 5,588,150 A | 12/1996 | Lin et al. | |
| 5,590,319 A | 12/1996 | Cohen et al. | |
| 5,590,324 A | 12/1996 | Leung et al. | |
| 5,596,744 A * | 1/1997 | Dao | G06F 16/256 707/999.01 |
| 5,642,515 A | 6/1997 | Jones et al. | |
| 5,675,791 A | 10/1997 | Bhide et al. | |
| 5,680,547 A | 10/1997 | Chang | |
| 5,694,591 A * | 12/1997 | Du | G06F 17/30463 707/999.002 |
| 5,710,915 A | 1/1998 | McElhiney | |
| 5,724,570 A | 3/1998 | Zeller et al. | |
| 5,787,251 A | 7/1998 | Hamilton et al. | |
| 5,797,136 A | 8/1998 | Boyer et al. | |
| 5,822,748 A | 10/1998 | Cohen et al. | |
| 5,832,477 A | 11/1998 | Bhargava et al. | |
| 5,857,180 A | 1/1999 | Hallmark et al. | |
| 5,905,981 A | 5/1999 | Lawler | |
| 5,918,225 A | 6/1999 | White et al. | |
| 5,924,088 A | 7/1999 | Jakobsson et al. | |
| 5,963,932 A | 10/1999 | Jakobsson et al. | |
| 5,974,408 A | 10/1999 | Cohen et al. | |
| 6,009,265 A | 12/1999 | Huang et al. | |
| 6,026,394 A | 2/2000 | Tsuchida et al. | |
| 6,032,143 A | 2/2000 | Leung et al. | |
| 6,044,378 A | 3/2000 | Gladney | |
| 6,061,676 A | 5/2000 | Srivastava et al. | |
| 6,289,334 B1 | 9/2001 | Reiner et al. | |
| 6,298,342 B1 | 10/2001 | Graefe et al. | |
| 6,339,768 B1 | 1/2002 | Leung et al. | |
| 6,370,524 B1 | 4/2002 | Witkowski | |
| 6,430,550 B1 | 8/2002 | Leo et al. | |
| 6,438,558 B1 | 8/2002 | Stegelmann | |
| 6,438,562 B1 | 8/2002 | Gupta et al. | |
| 6,529,896 B1 | 3/2003 | Leung et al. | |
| 6,529,901 B1 | 3/2003 | Chaudhuri et al. | |
| 6,535,874 B2 | 3/2003 | Purcell | |
| 6,510,422 B1 | 7/2003 | Galindo-Legaria et al. | |
| 6,615,203 B1 | 9/2003 | Lin et al. | |
| 6,622,138 B1 | 9/2003 | Bellamkonda et al. | |
| 6,684,203 B1 | 1/2004 | Waddington et al. | |
| 6,694,306 B1 | 2/2004 | Nishizawa et al. | |
| 6,792,420 B2 | 9/2004 | Chen et al. | |
| 6,801,905 B2 | 10/2004 | Andrei | |
| 6,901,405 B1 | 5/2005 | McCrady et al. | |
| 6,934,699 B1 | 8/2005 | Haas et al. | |
| 6,941,360 B1 | 9/2005 | Srivastava et al. | |
| 6,954,776 B1 | 10/2005 | Cruanes et al. | |
| 6,961,729 B1 | 11/2005 | Toohey et al. | |
| 6,980,988 B1 | 12/2005 | Demers et al. | |
| 6,990,503 B1 | 1/2006 | Luo et al. | |
| 7,031,956 B1 | 4/2006 | Lee et al. | |
| 7,072,896 B2 | 7/2006 | Lee et al. | |
| 7,089,225 B2 | 8/2006 | Li et al. | |
| 7,146,360 B2 | 12/2006 | Allen et al. | |
| 7,167,852 B1 | 1/2007 | Ahmed et al. | |
| 7,246,108 B2 | 7/2007 | Ahmed | |
| 7,440,935 B2 | 10/2008 | Day et al. | |
| 7,529,752 B2 | 5/2009 | Hinshaw et al. | |
| 7,702,627 B2 | 4/2010 | Ahmed et al. | |
| 8,392,405 B2 | 3/2013 | Idicula et al. | |
| 8,458,129 B2 | 6/2013 | Surlaker et al. | |
| 8,468,151 B2 | 6/2013 | Branscome et al. | |
| 8,521,723 B1 | 8/2013 | Ahmed | |
| 2001/0047372 A1 | 11/2001 | Gorelik et al. | |
| 2002/0038313 A1 | 3/2002 | Klein et al. | |
| 2002/0138376 A1 | 9/2002 | Hinkle | |
| 2003/0120825 A1 | 6/2003 | Avvari et al. | |
| 2003/0167258 A1 | 9/2003 | Koo et al. | |
| 2004/0068509 A1 | 4/2004 | Garden et al. | |
| 2004/0068696 A1 | 4/2004 | Seyrat et al. | |
| 2004/0143791 A1 | 7/2004 | Ito et al. | |
| 2004/0148278 A1 | 7/2004 | Milo et al. | |
| 2004/0167904 A1 | 8/2004 | Wen et al. | |
| 2004/0220911 A1 | 11/2004 | Zuzarte et al. | |
| 2004/0220923 A1 | 11/2004 | Nica | |
| 2004/0267760 A1 | 12/2004 | Brundage et al. | |
| 2004/0268305 A1 | 12/2004 | Hogg et al. | |
| 2005/0033730 A1 | 2/2005 | Chaudhuri et al. | |
| 2005/0076018 A1 | 4/2005 | Neidecker-Lutz | |
| 2005/0097099 A1 | 5/2005 | Kapoor et al. | |
| 2005/0149584 A1 | 7/2005 | Bourbonnais et al. | |
| 2005/0187917 A1 | 8/2005 | Lawande et al. | |
| 2005/0198013 A1 | 9/2005 | Cunningham et al. | |
| 2005/0210010 A1 | 9/2005 | Larson et al. | |
| 2005/0234965 A1 | 10/2005 | Rozenshtein et al. | |
| 2005/0278289 A1 | 12/2005 | Gauweiler et al. | |
| 2005/0278616 A1 | 12/2005 | Eller | |
| 2005/0283471 A1 | 12/2005 | Rafi | |
| 2005/0289125 A1 | 12/2005 | Liu et al. | |
| 2006/0026115 A1 | 2/2006 | Ahmed | |
| 2006/0026133 A1 | 2/2006 | Ahmed | |
| 2006/0041537 A1 | 2/2006 | Rafi | |
| 2006/0167865 A1 | 7/2006 | Andrei | |
| 2006/0168513 A1 | 7/2006 | Coulson et al. | |
| 2006/0230017 A1 | 10/2006 | Larson et al. | |
| 2007/0027880 A1 | 2/2007 | Dettinger et al. | |
| 2007/0044012 A1 | 2/2007 | Suver et al. | |
| 2007/0073643 A1 | 3/2007 | Ghosh et al. | |
| 2007/0162425 A1 * | 7/2007 | Betawadkar-Norwood | G06F 17/30451 707/999.002 |
| 2007/0179947 A1 | 8/2007 | Ahmed et al. | |
| 2007/0219951 A1 | 9/2007 | Ahmed et al. | |
| 2007/0219969 A1 | 9/2007 | Su et al. | |
| 2007/0219977 A1 | 9/2007 | Su et al. | |
| 2007/0219985 A1 | 9/2007 | Ahmed et al. | |
| 2008/0010240 A1 | 1/2008 | Zait | |
| 2008/0077606 A1 | 3/2008 | Fang et al. | |
| 2010/0005077 A1 | 1/2010 | Krishnamurthy et al. | |
| 2011/0072006 A1 * | 3/2011 | Yu | G06F 17/30451 707/718 |
| 2013/0205028 A1 | 8/2013 | Crockett et al. | |
| 2013/0226959 A1 | 8/2013 | Dittrich et al. | |
| 2014/0188841 A1 * | 7/2014 | Sun | G06F 17/30445 707/718 |
| 2015/0154258 A1 * | 6/2015 | Xiong | G06F 17/30463 707/718 |
| 2015/0234859 A1 * | 8/2015 | Johnson | G06F 16/951 707/612 |
| 2015/0269224 A1 * | 9/2015 | Kundu | G06F 17/30463 707/718 |

OTHER PUBLICATIONS

Ramez Elmasri and Shamkant B. Navathe. Fundamentals of Database Systems, third edition. Addison Wesley, New York, 2000, Title pages, Chapter 18 and Sections 24.2-24.4, pp. iii, iv, 585-628 and 771-786.*

Ramez Elmasri and Shamkant B. Navathe. Fundamentals of Database Systems, third edition. Addison Wesley, New York, 2000, Title pages, Chapter 18 and Sections 24.1-24.4, pp. iii, iv, 585-628 and 765-786.*

(56) References Cited

OTHER PUBLICATIONS

U.S. Appl. No. 13/552,419, filed Jul. 18, 2012, Notice of Allowance, dated May 28, 2013.
U.S. Appl. No. 11/716,126, filed Mar. 8, 2007, Office Action, dated Apr. 3, 2009.
U.S. Appl. No. 11/716,126, filed Mar. 8, 2007, Notice of Allowance, dated Nov. 18, 2009.
Dehaan, David, "A Rewriting Algorithm for Multi-Block Aggregation Queries and Views using Prerequisites and Compensations", Technical Report CS-2004-25, May 3, 2004, 39 pages.
Hayu, John, "Analytic SQL Features in Oracle9i", An Oracle Technical White Paper, Dec. 2001, 32 pages.
Graefe, Goetz, "Encapsulation of Parallelism in the Volcano Query Processing System," Mar. 1990, pp. 102-111.
George Lumpkin, Hakan Jakobsson, "Query Optimization in Oracle 9i", Oracle Corporation, Oracle White Paper, Feb. 2002, pp. 1-30.
Gail Erickson, author. Microsoft TechNet. Improving Performance with SQL Server 2000 Indexed Views. Microsoft Corp. Sep. 2000.
Fitzgerald et al., "Special Edition Using Crystal Reports IO", Que, Chapters 23, 24, 27, 35, Appendix A, Jul. 14, 2004, 170 pages.
Englert, Susan et al., "A Benchmark of NonStop SQL Release 2 Demonstrating Near-Linear Speedup and Scaleup on Large Databases", Tandem Part No. 27469, May 1989, pp. 1-23.
Bergsten, et al., "Prototyping DBS3 a Shared-Memory Parallel Database System", IEEE 818622954, 226-234, 1991, pp. 226-234.
Deutsch, Alin et al., Minimization and Group-By Detection for Nested Xqueries, University of California, San Diego, 2003, 15 pages.
Leverenz et al., "Oracle 8i Concepts Release 8.1.5-A67781-01", Oracle Corporation, Feb. 1999, <http://www.csee.umbc.edu/help/oracle8/server.815/a67781/toc.htm>, 122 pages.
Dayal, Umeshwar, "Of Nests and Trees: A Unified Approach to Processing Queries That Contain Nested Subqueries, Aggregates and Quantifiers", Brighton 1987, pp. 197-208.
Copeland, George et al., "Data Placement in Bubba," ACM 0897912683, 1988, pp. 99-108.
Chen, et al., "View merging in the context of view selection changing", Database Engineering and Applications Symposium 2002, Proceedings, Jul. 2002, 10 pages.
Chaudhuri, Surajit, "An Overview of Query Optimization in Relational Systems", Microsoft Research, 1998, 10 pages.
Cesar Galindo-Legaria & Arnon Rosenthal. Outerjoin Simplification and Reordering for Query Optimization. ACM 1997.
Blakeley et al., "Distributed/heterogeneous Query Processing in Microsoft SQL Server", Data Engineering, 2005. ICDE 2005. Proceedings. 21st International Conference, dated Apr. 2005, 2 pages.
Bhide, Anupam, "An Analysis of Three Transaction Processing Architectures", Computer Science Division, UC Berkeley, Proceeding of the 14th VLDB Conference,1998, pp. 339-350.
Dewitt, et al., "A Performance Analysis of the Gamma Database Machine," Computer Sciences Department, University of Wisconsin, 1988, pp. 350-360.
Praveen Seshadri et al. Cost-Based Optimization for Magic: Algebra and Implementation. SIGMOD Jun. 1996. ACM 1996.
Surajit Chaudhuri et al. Including Group-by in Query Optimization. Hewlett-Packard Laboratories. 20th VLDB Conference. Chile, 1994.
Stonebraker, Michael, et al. "The Design of XPRS," Proceedings of the 14th VLDB Conference, 1988, pp. 318-330.
Selinger, P. Griffiths, et al., "Access Path Selection in a Relational Database Management System", ACM SIGMOD International Conference on the Management of Data, 1979, pp. 23-34.
Salem et al., "A (FM/DRDPE)-based approach to improve federated learning optimizer",Computer Engineering & Systems, 2007. ICCES '07. International Conference, dated Nov. 2007, 2 pages.
Response to Office Action, U.S. Appl. No. 11/237,040, dated Feb. 10, 2010, 20 pages.
Rankins et al., "Microsoft SQL Server 2000 Unleashed," Second Edition, Sams, Chapters 3, 4, 5, 6, 36, Dec. 18, 2002, 109 pages.
Rafi Ahmed, "Affidavit of Rafi Ahmed", dated Feb. 8, 2010, 3 pages.
Hirano, et al., "Load Balancing Algorithm for Parallel Processing on Shared Memory Multiprocessor", IEEE, pp. 210-217, 1991.
Priti Mishra et al. Join Processing in Relational Databases. ACM Computing Surveys. Mar. 1992.
Hong, et al., "Optimization of Parallel Query Execution Plans in XPRS ", Proceedings of the First International Conference on Parallel and Distributed Information Systems, IEEE, 1991, pp. 218-225.
Pirahesh, Hamid, et al., "Extensible/Rule Base Query Rewrite Optimization in Starburst", IBM Almaden Research Center, dated Jun. 2, 21992, 10 pages.
Oracle, "Oracle 91 Database Documentation", Oracle, Parts A96670-01, A96674-01, A96673-02, 2002, 833 pages.
Oracle, "Optimizer Modes, Plans Stability, and Hints", Oracle8i Tuning Release 8.1.5 A67775-01, Oracle Website, 1999, 54 pages.
Muralikrishna, M., Improved Unnesting Algorithms for Join Aggregate SQL Queries, VLDB Conference, Canada, 1992, 12 pages.
Mumick, I. et al., "Maintenance of Data Cubes and Summary Tables in a Warehouse", ACM 1997, pp. 100-111.
Li, C. et al., "Minimizing View Sets without Losing Query-Answering Power", 2001, Springer, pp. 99-113.
Tandem, "A Benchmark of NonStop SQL on the Debit Credit Transaction", The Tandem Performance Group, 1988, pp. 337-341.
Rafi Ahmed et al., "Cost-Based Query Transformation in Oracle," Copyright 2006 VLDB, ACM 1595933859, pp. 1026-1036.

\* cited by examiner

MULTI-SYSTEM QUERY EXECUTION PLAN

FIELD OF THE INVENTION

The present invention relates to electronic database management systems.

BACKGROUND

With exponentially growing data volumes, the fast access to data has become critical for applications utilizing database management systems (DBMS). With the presence of large datasets, applications have to submit complex and thus, long running queries to DBMSs. To expedite query executions for applications, many different architectures have been developed for a DBMS.

However, the different DBMS architectures achieve better performance in part by compromising on some features of a DBMS. For example, a high-speed in-memory DBMS has limited capacity because the volatile memory required for the DBMS is generally more expensive, and thus may not contain full set of data in volatile memory. Other DBMS architectures optimize the execution of queries for a particular set of operations and have degraded performance for other operations. Accordingly, an application utilizing such a DBMS may have desirable performance on some queries, while less than desirable performance for other queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
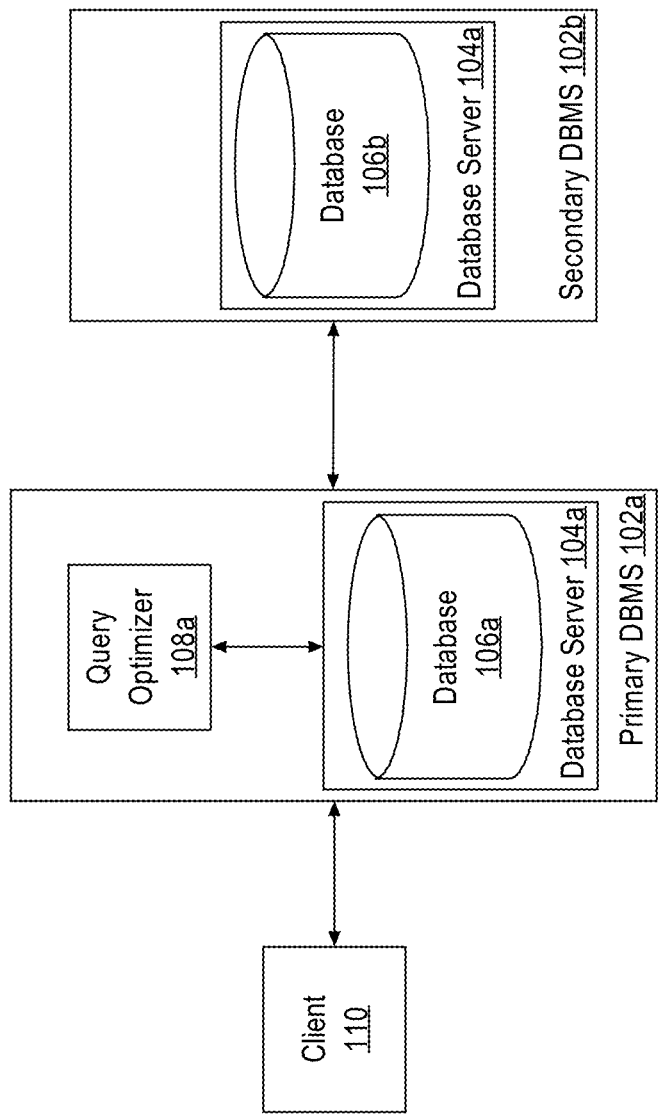
FIG. 1 is a system diagram that illustrates query processing by a primary database management system and a secondary DBMS, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The techniques described herein provide for a determination of a query execution plan that is optimized for offloading database operations onto multiple database management systems (DBMS). In an embodiment, a query optimizer on a primary DBMS that receives a request for an execution of a query, performs an operation cost evaluation for one or more execution plans for the query. "Operation cost" or "cost of an operation," as referred to herein, is a measurement in units of work or resources used to execute a database operation on a DBMS. For example, the cost of executing an operation may represent an estimate of the number of disk input/output (I/O) operations, the amount of central processing units (CPU) and memory used in performing the operation on the DBMS. Each DBMS may estimate the cost of an operation on the DBMS based on a cost function. The cost function of a DBMS may be designed to take into consideration the hardware architecture of the DBMS, software execution models of the DBMS, and how data is stored on the DBMS. Therefore, the cost of an operation may vary from one DBMS to another DBMS.

In addition to determining the estimate of an operation cost on a primary DBMS that received the request for a query execution, the query optimizer may also request an estimate of the operation costs from another DMBS, referred herein as a "secondary DBMS." According to embodiments, the secondary DBMS and the primary DBMS are heterogeneous based on differences in a DBMS architecture, software, operating system, compute and storage hardware, data storing methodology and other factors, as further described herein. Furthermore, with respect to database data that is stored at the primary DBMS and to which access is required by a query to offload, the secondary DBMS stores a copy of at least a portion of database data stored and supports at least a portion of operations supported by the primary DBMS. The copy may be stored in different storage format, as described below.

Accordingly, in an embodiment, an operation on the primary DBMS may be feasible to execute on the secondary DBMS. Based on the feasibility of executing the operation on the secondary DBMS and the cost of the operation for the primary DBMS and the secondary DBMS, the operation may be denoted for offloading to the secondary DBMS. "Offloading," as used herein, refers to one DBMS requesting another DBMS to execute a particular database operation. Since operations are denoted for offload only when their operation costs are less on the secondary DBMS as compared to the primary DBMS, the total cost of executing a query may be substantially decreased on the primary DBMS with offloading. In some embodiments, the query optimizer may take into account an overhead cost of the primary DBMS communicating with the secondary DBMS to more accurately evaluate the benefits for offloading an operation.

In another embodiment, the query optimizer takes into account operation costs with offloading when selecting an execution plan for a query. According to such embodiment, the operation cost for a secondary DBMS affects the selection of an execution plan by a query optimizer. Therefore, the selected execution is further optimized for offloading operations to a secondary DBMS and the total cost of query execution is further decreased.

The foregoing approaches, structures, and functions are described further herein in connection to FIG. 1 and other drawings.

System Overview

FIG. 1 is a system diagram that illustrates query processing by primary database management system (DBMS) 102*a* and secondary DBMS 102*b*, in an embodiment. To process queries, primary DBMS 102*a* includes query optimizer 108*a* and database server 104*a*, which further includes database 106*a*. Secondary DBMS 102*b* includes database server 104*b*, which includes database 106*b*. Secondary DBMS 102*b* may be located at a location that is remote relative to primary DBMS 102*a* but connected through a network, such as a local area network (LAN), or a wide-area network (WAN) such as the Internet.

Databases 106*a* and 106*b* store database objects like tables in volatile and/or non-volatile memory of database server 104*a* and 104*b*, respectively. To retrieve data from data tables in database 106*a*, client 110 sends a request for a query execution to primary DBMS 102*a*. In order to execute the query, query optimizer 108*a* parses the query and generates a permutation of execution plans consisting of operations on database objects. As used herein, "execution plan" is an ordered set of database operations used to access data in a database management system. Each operation may be performed on one or more database objects or output data of another operation. Each permutation of an execution plan may include different order of join operations, referred herein as "join order."

In an embodiment, one or more operations of an execution plan may be supported on secondary DBMS 102*b* as well. If the database 106*b* contains the database objects, such as tables, necessary for an operation, and database server 104*b* supports the type of the operation requested, then database server 104*b* may execute the operation on database 106*b*. Using an interface provided by secondary DBMS 102*b*, query optimizer 108*a* communicates with secondary DBMS 102*b* to determine the feasibility for an operation, in an embodiment. In some embodiments, in addition to the feasibility of the operation, secondary DBMS 102*b* may also provide to query optimizer 108*a* the estimated cost of the operation. Based on this information and using techniques described herein, query optimizer 108*a* determines whether to denote the operation, within the execution plan, for offloading on to secondary DBMS 102*b*.

In an embodiment, secondary database 106*b* may be a backup or standby database of primary database 106*a*. However, the techniques described herein are independent of whether the primary or the secondary databases are a backup or standby, or whether the primary or the secondary databases are primary databases in the primary versus backup/standby context. For example, the techniques described herein may be used by a standby/backup DBMS to offload operations onto a primary DBMS to execute a received query.

In other embodiments, more than one secondary DBMSs may be used for offloading. In such embodiments, query optimizer 108*a* may request information about feasibility from all the secondary DBMSs and may evaluate all permutations for offloading a particular operation on each of the secondary DBMSs.

In an embodiment, primary DBMS 102*a* may be a relational DBMS that persistently stores a full set of tables in database 106*b* for a particular instance of a database. On the other hand, secondary DBMS 102*b* may be a high-performance in-memory execution DBMS, with a highly parallel system of disk-less compute nodes and with large overall volatile memory capacity and high-speed, large bandwidth interconnects. Such secondary DBMS may be generally described as a set of clusters of hierarchies; each hierarchy has compute nodes and memory at the leaves. The secondary DBMS may be very efficient at processing a well-defined set of query primitives at low power consumptions but may not contain the full set of tables due to volatile memory capacity constraints. In an alternative embodiment, primary DBMS 102*a* may be a high-performance in-memory execution DBMS, while secondary DBMS 102*b* may be a relational DBMS.

In an embodiment, primary DBMS 102*a* may be heterogeneous from secondary DBMS 102*b* based on a DBMS software. The primary DBMS may run software of a different revision, model and/or a vendor. For example, primary DBMS 102*a* may run Oracle 12c©, while secondary DBMS 102*b* may run Oracle 11g©, or vice versa.

Similarly, the primary DBMS may run on a different operating system from the secondary DBMS, in an embodiment. The operating system may be different based on a vendor, model and/or revision. For example, primary DBMS 102*a* may run on a Windows Server 2012© operating system, while the computer systems executing secondary DBMS 102*b* may have a Red Hat Enterprise Linux 7© operating system installed and running.

In another embodiment, primary DBMS 102*a* and secondary DBMS 102*b* may be heterogeneous based on utilization of different database schema same data. A database schema defines relationships and constraints imposed on data objects in a database, such as a data type of a column, or a foreign key relationship between columns of tables. The database schema for database 106*a* may impose different constraints and relationship on the same data, copy of which is also stored in database 106*b*. For example, database 106*b* may store certain data in a table as an XML type, while database 106*a* may store the copy of the certain data as a denormalized set of relational tables.

In a related embodiment, for semi-structured format data, such as XML, various different types of storage mechanisms may be used to store the data in data objects in the primary DBMS as compared to the secondary DBMS. One type of storage mechanism stores a XML data in a row of a table. Accordingly, nodes of such XML data are stored in separate columns in the row. Another mechanism is to store XML data in a lob (large object) in a column. XML data may also be divided and stored as a hierarchy of objects in a database; each object of XML data is an instance of a data object and stores one or more elements of the XML data. Binary-encoded XML is another form in which XML data may be stored in a database. Binary-encoded XML is a compact binary representation of XML that was designed to reduce the size of XML data.

In an embodiment, primary DBMS 102*a* may be heterogeneous from secondary DBMS 102*b* because the primary DBMS stores data in database 106*a* in different format from database 106*b*. There are several formats for storing data in a database, such as a row-major format, column-major format and hybrid format. In row-major format, column values of a single row are stored contiguously within a data block of a database. In column-major format, values of a column of multiple rows are stored contiguously in a data block, and a data block may only contain the values for one column. In hybrid-columnar format, for subsets of rows of a table, a data block may hold the entirety of each subset of rows. However, within the data block, the columns of the subset rows may be stored in column-major format. Hence, a single row of a table may be spread among several data blocks. For example, database 106a may store data in a column major or hybrid format, while database 106b may store data in a row-major or hybrid format, or vice versa. In a related embodiment, the primary DBMS may compress data stored in database 106a, while the secondary DBMS may store data uncompressed in database 106b. In another related embodiment, both the primary DBMS and the secondary DBMS may compress data stored in the respective databases. However, the primary DBMS may utilize a different compression level from the secondary DBMS for same data stored.

In an embodiment, primary DBMS 102a may be heterogeneous from secondary DBMS 102b because of different hardware. Computing devices of the primary DBMS may have different components from computing devices of the secondary DBMS. For example, the primary DBMS may be running on different architecture processors with different speeds, attached to different size of main memory. Similarly, in a related embodiment, primary DBMS 102a may store data on storage devices with different architecture than secondary DBMS 102b. The primary DBMS may have tiered storage architecture, where most accessed data is stored on storage that has faster speeds of access, such as solid state disks, and least accessed data is stored on slower speed storage devices, such as low revolution per minute (RPM) magnetic disks. On the other hand the secondary DBMS may store data in non-tiered storage devices, or vice versa.

In another related embodiment, the primary DBMS may utilize enhanced storage devices, while the secondary DBMS may not, or vice versa. An enhanced storage device is a storage device configured to work cooperatively with a database server, and to provide filtered and unfiltered data blocks to the database server. An enhanced storage device may perform some filtering of the data in the data blocks based on filtering criteria provided by the database server. The enhanced storage device may be equipped with modules configured to determine compression formats, evaluate costs associated with sending data to the storage server, and perform selectivity of each predicate.

In other embodiments, primary DBMS 102a may be heterogeneous from secondary DBMS 102b because of different execution data and control flows.

Baseline Execution Plan with Offloading

In an embodiment, a baseline execution plan selected by query optimizer 108a for primary DBMS 102a may be further improved by offloading one or more operations of the execution plan to secondary DBMS 102b. "Baseline execution plan," as used herein, refers to an execution plan that has been selected as an optimal execution plan for a query or a query block on a particular DBMS. A query block is a particular part, of a query, that is selected based on one or more criteria. For example, a particular query block may contain the most nested/chained operations in the query. Although, the techniques herein may be described from the perspective of a query, the same techniques may apply to a particular query block.

In an embodiment, the baseline execution plan has a particular join order selected by the query optimizer estimated to be least costly for a query execution on the particular DBMS. In another embodiment, the baseline execution plan is selected based on predefined rules of the particular DBMS.

Figure 2:
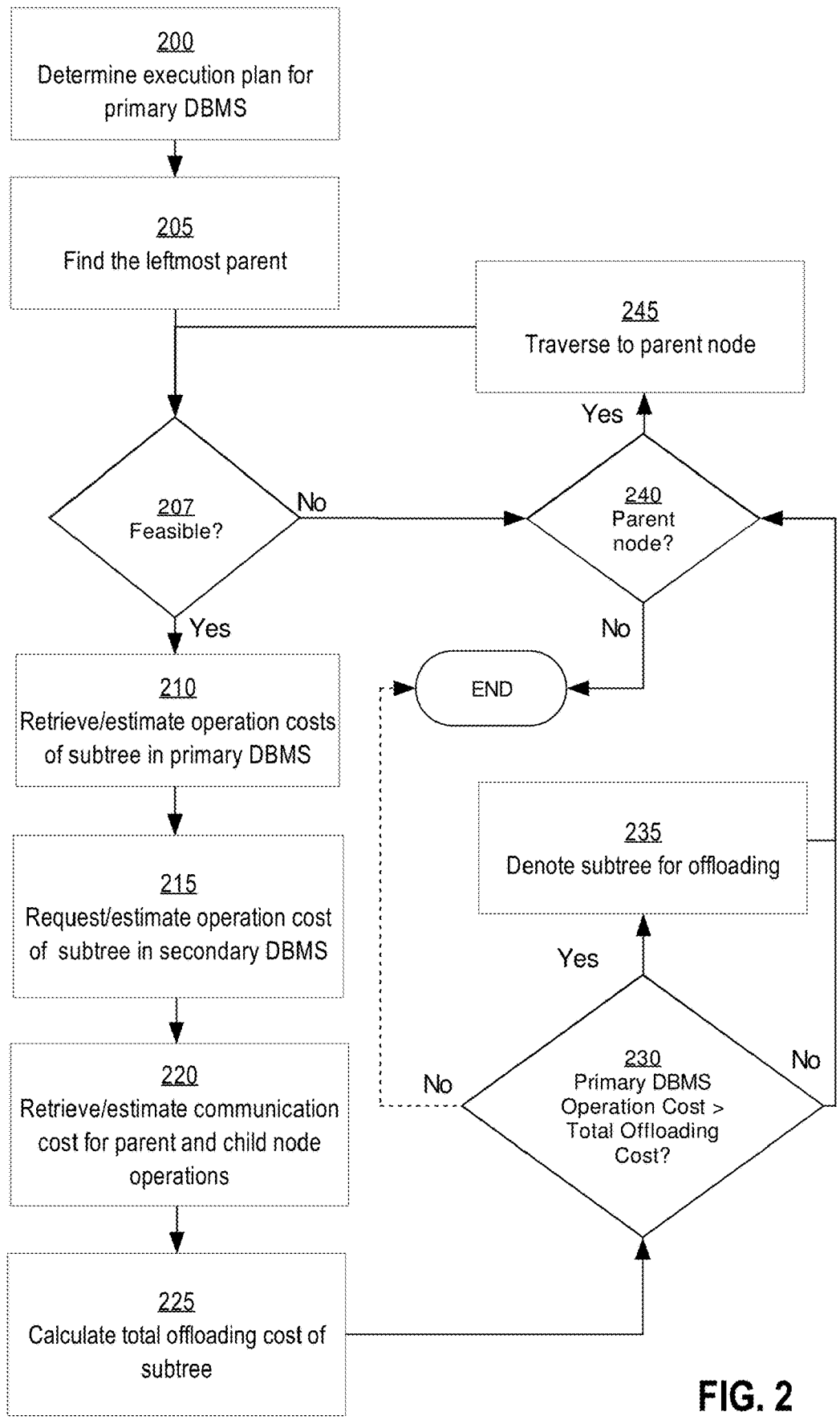
FIG. 2 is a flow diagram that depicts a process of improving the estimated cost of a baseline execution plan through offloading one or more operations of the plan onto a secondary DBMS, in an embodiment.

FIG. 2 is a flow diagram that depicts a process of improving the estimated cost of a baseline execution plan through offloading one or more operations of the plan onto secondary DBMS 102b, in an embodiment. In some embodiments, only a portion of the baseline execution plan may be evaluated for offloading to secondary DBMS 102b. The portion to be evaluated may be selected based on one or more criteria, such as types and costs of the operations and the number of interdependent operations within the portion. For convenience, a portion of an execution plan is referred here in as an "execution plan" as well.

At block 200, query optimizer 108a selects a baseline execution plan optimal for execution of a query on the primary DBMS. For example, the query optimizer on the primary DBMS may select the execution plan for the query below:

```
SELECT *
  FROM (
  SELECT c_custkey ,
      c_name ,
      sum ( l_extendedprice * ( 1 - l_discount ) ) as revenue ,
      c_acctbal ,
      n_name ,
      c_address ,
      c_phone ,
      c_comment
  FROM customer ,
      orders ,
      lineitem ,
      nation
  WHERE c_custkey = o_custkey
      and l_orderkey = o_orderkey
      and o_orderdate >= date '1993-10-01'
      and o_orderdate < date '1993-10-01' + interval '3' month
      and l_returnflag = 'R'
      and c_nationkey = n_nationkey
  GROUP BY c_custkey ,
      c_name ,
      c_acctbal ,
      c_phone ,
      n_name ,
      c_address ,
      c_comment
  ORDER BY revenue desc )
  WHERE rownum <= 20;
```

Example Query 1

Figure 3A:
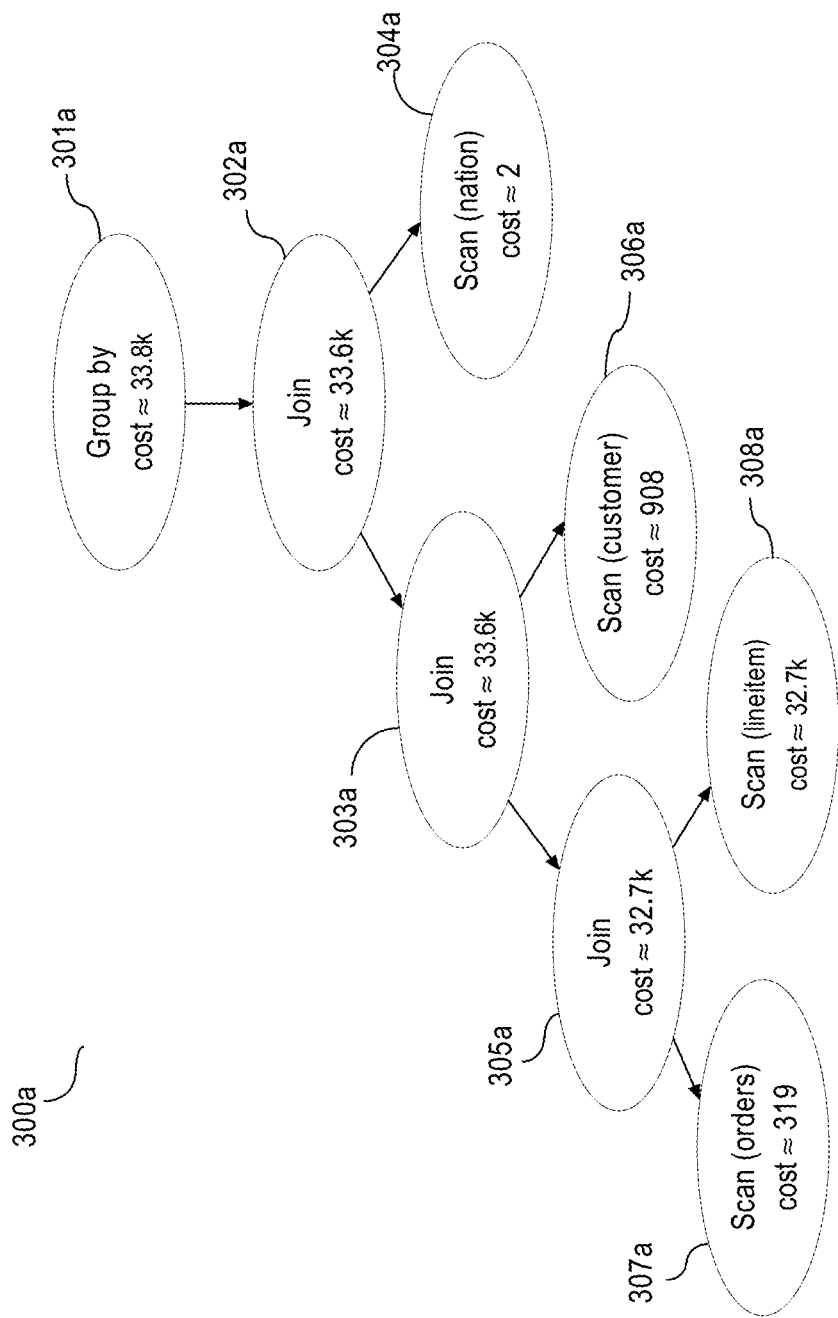
FIG. 3A depicts a graphical representation of an execution plan generated by a query optimizer of a primary database to execute a query, in an embodiment.

FIG. 3A depicts a graphical representation of the execution plan generated by the query optimizer of the primary DBMS to execute the example query 1 on the primary database. Tree 300a includes multiple levels represented by nodes 301a, 302a, 303a, 304a, 305a, 306a, 307a, 308a. Node 301a represents the root node of tree 300a, the highest level of tree 300a, and nodes 304a, 306a, 307a, and 308a represent leaf nodes of tree 300a, the bottom or lowest levels of tree 300a. Nodes 301a, 302a, 303a, 304a, 305a, 306a, 307a, 308a, each node of the tree, represent node operations. "Node operation" refers herein to a plan operation represented within a node. "Plan operation" refers herein to a database operation of an execution plan that may take as an operand one or more database objects, such as a table, or one or more results of other database operations. Accordingly, a node operation takes as an operand either a database objects, such as table, or results of child node operations, node operations of child nodes.

At block 205, leftmost operation node is located for the baseline execution plan tree. "Leftmost operation node" refers herein to a most deeply nested operation of an execution plan. The leftmost operation node is located in order to iterate through each operation of the execution plan from the most nested operations to the last operation that produces the result for the query or the query block. Such iteration may be graphically depicted as traversing the tree of the execution plan from bottom up from the lowest level of the tree to the highest level of the tree.

In the example of FIG. 3A, the leftmost operation node is node 307*a*. The traversal of tree 300*a* occurs from nodes 307*a* and 308*a*, at the lowest levels, to node 301*a*, at the highest level. The traversal follows the execution sequence pattern of the execution plan, where nodes 307*a* and 308*a* are executed first. The intermediate levels, represented by nodes 302*a*, 303*a*, 304*a*, 305*a*, 306*a*, perform various transformations on results produced by the underlying levels. The highest level, the root node 301*a*, produces, by composition, the result of the execution plan and thus, the result of the query or the query block represented by the execution plan.

To evaluate which operations of the execution plan to offload, the process, in FIG. 2 traverses through the tree. At each node, the process evaluates the feasibility and cost of the node operation. However, to determine the feasibility of an operation that takes as an input other operations, the whole subtree of nodes that is rooted at the current node may need to be evaluated. In other words, if the process has traversed to a particular node in the tree, the process may evaluate all the operations in the (immediate and non-immediate) child nodes because the operation at the current node cannot be executed without the operations at the child nodes having been executed first.

Accordingly, to determine whether the operation at a root node of a subtree of nodes may be executed on the secondary DBMS, each subtree node's operation is evaluated for feasibility of operation on the secondary DBMS at block 207. An operation of an execution plan is considered to be feasible on a DBMS, if a) the data that the operation is performed on may be located on the DBMS, and b) the operation is supported by the DBMS such that all computations required for the operation, including the operation itself and related expressions, are supported by the DBMS. If either the operation is not supported or the data is not present on the DBMS, then the operation described in the node is not feasible for execution on the DBMS. In other embodiments, other factors may be taken into account in the feasibility evaluation such as support for predicate evaluation and data filtering at the DBMS.

To evaluate the feasibility of an operation, the query optimizer may communicate with the secondary DBMS to request such information. In another embodiment, the query optimizer may rely on the local information at the primary DBMS to determine whether a particular operation or data is supported by the secondary DBMS. The local information may include information gathered based on previous requests or manually entered by a user of a primary DBMS.

In some embodiments, the feasibility evaluation for an operation may be skipped all together, if the feasibility of the operation has been previously evaluated. During the traversal of the subtree, if any of the child node operations have been already evaluated for feasibility, the process may not repeat the evaluation again but rather re-use the result of the previous evaluation. For example, if the process reaches a child node that is marked as feasible, the process may not need to traverse any further to the children nodes and may rather assume that all the children of the child node have been evaluated and marked feasible. Similarly, if a child operation is evaluated as non-feasible, then the current node operation may be automatically evaluated to non-feasible as well.

Figure 3B:
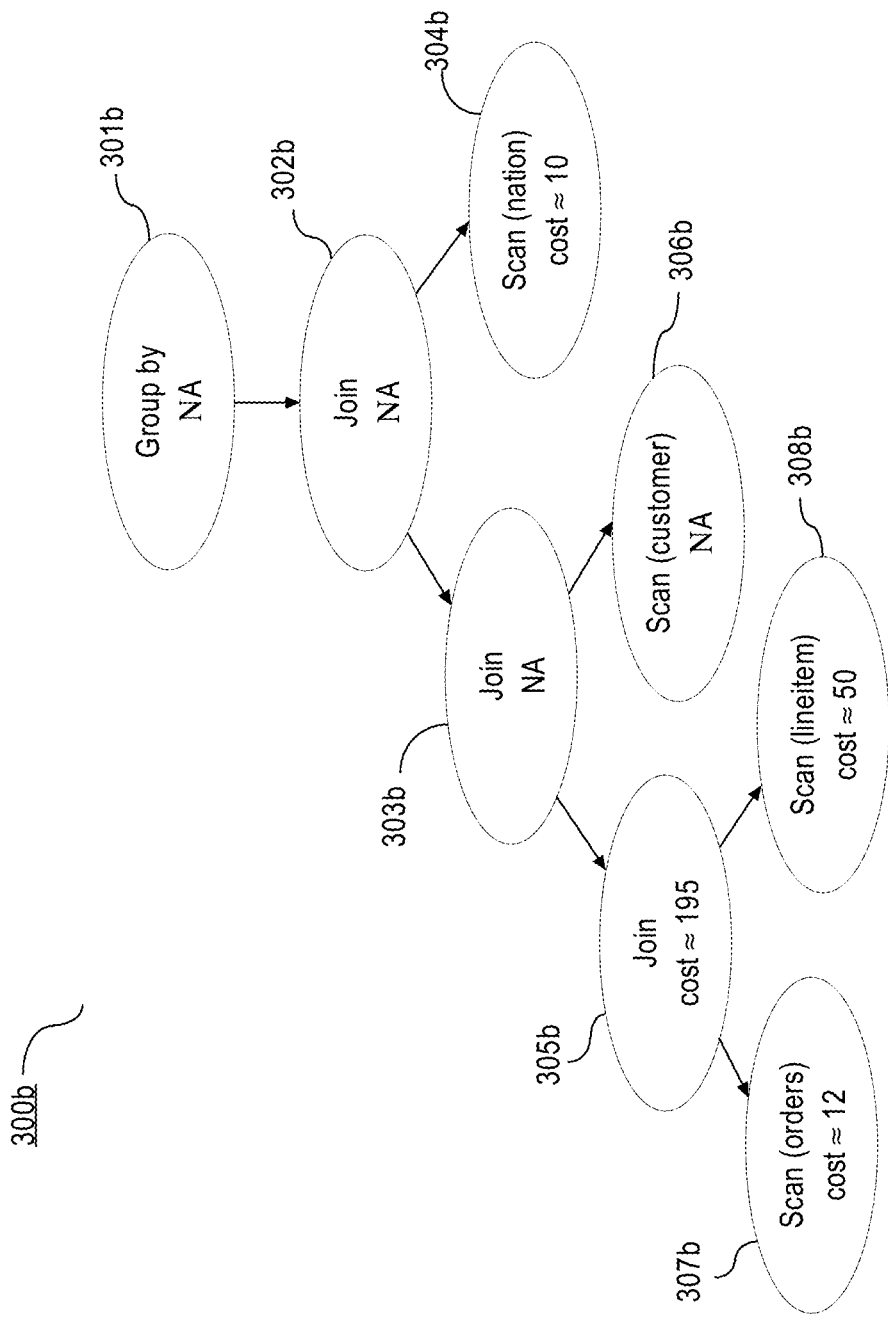
FIG. 3B depicts a graphical representation of a feasibility and operation cost evaluation for the execution plan depicted in FIG. 3A on a secondary DBMS, in an embodiment.

FIG. 3B depicts a graphical representation of the execution plan in FIG. 3A, with feasibility and operation cost evaluations on secondary DBMS 102*b*, in an embodiment. For each operation of tree 300*a* in FIG. 3A, the query optimizer of the primary database determines whether executing the operation on the secondary DBMS is feasible. Nodes 301*b*, 302*b*, 303*b*, 304*b*, 305*b*, 306*b*, 307*b*, 308*b* of tree 300*b* in FIG. 3B represent the feasibility of operations of the corresponding nodes 301*a*, 302*a*, 303*a*, 304*a*, 305*a*, 306*a*, 307*a* and 308*a* of tree 300*a* in FIG. 3A. The query optimizer may first evaluate the leftmost operation node, node 307*a*. The node 307*a* is a leaf node and thus, no subtree exists for the node to evaluate further. Node 307*a* contains both an operation, scan, as well as a data source, "orders" table. The query optimizer determines whether "orders" table is present on the secondary DBMS and whether the scan operation is supported by the secondary DBMS. If, either "orders" table is not present on the secondary DBMS, or "scan" operation is not supported by the secondary DBMS, then node 307*a* operation is not feasible on the secondary DBMS and the process may not offload the operation to the secondary DBMS.

In another example based on FIG. 3A, the feasibility of the subtree of nodes with node 305*a* at the root is determined. The query optimizer may proceed bottom up or downward through the subtree to check feasibility of each node's operation. Proceeding downward, the query optimizer may check for node 305*a* whether the join operation is supported in the secondary DBMS. If so, the process may continue the check further and proceed to node 308*a*. Node 308*a* contains both an operation, scan, as well as a data source operand "lineitem" table. The query optimizer requests from the secondary DBMS information on whether "lineitem" table is present on the secondary DBMS and whether the scan operation is supported by the secondary DBMS. If either "lineitem" table is not present or "scan" operation is not supported by the secondary DBMS, then node 308*a* operation is not feasible on the secondary DBMS and the process may not offload the parent node 305*a* operation to the secondary DBMS as well. Otherwise, the query optimizer may proceed to node 307*a* for further evaluation. Since node 307*a* has been already evaluated, the query optimizer may re-use the prior evaluation or, alternatively, may re-evaluate node operation's feasibility as in the example above. If any of the operation nodes in the subtree are not feasible, then no other node needs to be evaluated for feasibility, and the process may end. On the other hand, if all operations in a subtree of operation nodes are determined to be feasible, then the subtree of nodes may be marked for offloading.

At block 210, the operation costs of the subtree of nodes are estimated or retrieved for the primary DBMS. The operation costs for the primary DBMS may be retrieved rather than newly evaluated, if the query optimizer has selected the baseline execution plan based on evaluations of operation costs of each operation on the primary DBMS. If so, the estimated operation costs for each node are already known for the primary DBMS.

In another embodiment, the query optimizer may have selected the baseline execution plan based on pre-set rules, and the operation costs for the nodes may not have been evaluated on the primary DBMS. According to such embodiment, at block 210, the process evaluates the operation costs for the root node and the child nodes of the subtree, and then adds the operations costs together to determine the operation cost for the sub-tree of operations.

Continuing with the FIG. 3A example, nodes 301*a*, 302*a*, 303*a*, 304*a*, 305*a*, 306*a*, 307*a*, 308*a* depict the cost of executing their respective database operations. Node 307*a* and node 308*a* represent table scan operations of the "orders" and the "lineitem" tables, respectively. The cost of executing these operations on the primary database are approximately 319 and 32,700 units, respectively. Node 305*a* represents a join operation of row sets from node 307*a* and 308*a*. The cost represented by node 305*a*, 32,700 units, represents approximately the combination of the costs of executing the operations of node 307*a*, node 308*a*, and the cost of executing the operation represented by node 305*a*.

Node 306*a* represents table scan operation of the "customer" table and the cost of executing this operation on the primary database is 908 units. Node 303*a* represents a join operation of result sets from node 305*a* and node 306*a*. The cost represented by node 303*a*, approximately 33,600 units of work or resource used, represents approximately the combination of the costs of executing the operations of node 305*a*, node 306*a* and the cost of executing the join operation of node 303*a*. Node 304*a* represents a table scan operation of "nation" table and the cost of the table scan operation of node 304*a* is approximately 2 units. The result sets of node 303*a* and node 304*a* are joined by the join operation of node 302*a*. The cost represented by node 302*a*, approximately 33,600 units of work or resource used, represents approximately the combination of the costs of executing the operations of node 303*a*, node 304*a* and the cost of executing the join operation of node 302*a*. Node 301*a* represents a group operation of the result set of the operation represented by node 302*a*. The cost represented by node 301*a*, approximately 33,800 units, is the combination of the costs of executing the operation of node 302*a* and the group operation of node 301*a*. The cost represented by node 301*a* is also approximately the cost of executing the execution plan of example query 1 on the primary DBMS.

Continuing with FIG. 2 flow diagram, once an operation cost on the primary DBMS is determined, the process continues with the evaluation of operation cost for offloading the operation. However, in an embodiment, the query optimizer may assume that offloading any part of a query execution onto a second system would improve the performance. In such embodiment, the process skips the blocks 210-230 and proceeds to block 235, to denote the operation for offloading.

In other embodiments, to compare the operation costs for operations in the subtree on the primary DBMS with the secondary DBMS, each node's operation in the subtree is evaluated on the secondary DBMS at block 215. The query optimizer may communicate with the secondary DBMS to request the secondary DBMS to evaluate the cost of the operations and return the estimated operation cost. However, to evaluate the operation cost for a node operation, the child node operations need to be evaluated first unless the child node operation costs have already been evaluated. Thus, in one embodiment, the evaluation of an operation node proceeds from bottom of the subtree up, where the leaf operation nodes are first evaluated and then, their parents until the root node of the subtree.

In an embodiment, the query optimizer may request the operation cost evaluation of each operation node on the secondary DBMS separately, or may request the evaluation of the operation cost for the whole operation subtree from the secondary DBMS. In another embodiment, the query optimizer may evaluate the subtree of operation nodes without requesting the evaluation from the secondary DBMS but rather base the evaluation on the known characteristics of the secondary DBMS. For example, such characteristics may include statistics about the secondary DBMS execution of the evaluated operation or relative information on how much faster or slower an operation executes on the secondary DBMS compared to the primary DBMS.

FIG. 3B depicts the execution plan of tree 300*a* in FIG. 3A evaluated on the secondary DBMS, in an embodiment. The query optimizer of the primary database traverses the tree 300*b* from the lowest levels to determine the estimated operation cost for the tree and for each node operation of the tree. At node 307*b*, the query optimizer of the primary DBMS determines that the estimated cost of executing the scan operation represented by node 307*a* is approximately 12 units on the secondary DBMS. Similarly, at node 308*b*, the query optimizer determines that the table scan operation of the "lineitem" table has an estimated operation cost of 50 units on the secondary DBMS. The operations represented by nodes 305*a*/305*b* are also feasible on the secondary DBMS, and the secondary DBMS operation cost is estimated to be 195 units. However, neither the 303*b*/303*a* operation, nor the 306*b*/306*a* operation is feasible on the secondary DBMS because, as determined previously, "customer" table is not located in the secondary DBMS. Therefore, neither the "scan" nor "join" operation may be performed on the table.

Traversing up the tree, a new subtree rooted at node 303*a*/303*b* is evaluated for operation cost on the secondary DBMS. The operation at leaf node 304*a*/304*b* is feasible on the secondary DBMS with operation cost of 10 units. However, the operation at root node 302*a*/302*b* is not feasible because one of its child nodes, node 303*b*, is not feasible. Similarly, the root node of the subtree 301*b* is not feasible as well because node 302*b* is not feasible, and thus is not evaluated for the operation cost on the secondary DBMS.

In some embodiments, in addition to the operation cost estimated by the secondary DBMS, a communication cost for executing the operation on the secondary DBMS is included in the operation cost. "Communication cost," as used herein, refers to the cost of sending requests for an operation execution to secondary DBMS 102*b* and receiving the results of the execution from the secondary DBMS. In an embodiment, a communication cost includes the network cost of transferring the requests/results from the secondary DBMS to the primary DBMS and the CPU cost of necessary computations to convert data into/from the format used for operation execution on the primary DBMS and the secondary DBMS.

In an embodiment, a communication cost is incurred only at the operation which is at the root of a subtree of operation nodes denoted for offloading. Since offloading each individual operation in a subtree of operations may be redundant, the subtree of operations incurs a single communication cost. However, when the execution plan subtree is traversed bottom-up for an offloading evaluation, the process may assume that the current root operation node is the root of the sub-tree to be offloaded to the secondary DBMS. If the assumption turns to be incorrect and a parent node's subtree is denoted for offloading, then the communication cost of the child node operations are subtracted from the parent operation cost.

At block 220, the process estimates communication cost of offloading the subtree of operation nodes at the current operation node to the secondary DBMS, in an embodiment. The communication cost of the subtree may include one or more of the following overhead costs: cost of converting the operations of the subtree to a particular format to transmit the request for execution to the secondary DBMS, cost of sending the request to the secondary DBMS, cost of converting the results generated from running the operations on the secondary DBMS to a format to send back to the primary DBMS, cost of sending the results to the primary DBMS, and cost of processing the results on the primary DBMS. In some embodiments, the communication cost may be assumed to be fixed or, in other embodiments, may depend on estimates for the one or more of the above listed overhead operations and may be specific to each particular operation.

In an embodiment, at block 225, the estimated communication cost of offloading the subtree of operation nodes at the current operation node to the secondary DBMS is added to the estimated offloading operation cost for the nodes on the secondary DBMS. In some embodiments, if communication costs for any of the children operation nodes have been added to the current node operation cost, the children communication costs are subtracted from the current node's subtree's total offloading cost to ensure that a communication cost is not accounted for more than once.

For instance, continuing with the execution tree depicted in FIG. 3B, for estimating the communication cost for offloading the node 307b operation, the cost of sending and receiving results for the operation is considered. The communication cost may include sending the scan (orders) operations to the secondary DBMS, the secondary DBMS using its resources to package the results of the operations, network cost of receiving the packaged results, and the processing cost on the primary DBMS to have the results available for node 305a operation in FIG. 3A. Similarly, the communication cost for the node 308b operation may be estimated and included in the operation cost for offloading the operation.

When estimating the total operation cost for offloading the subtree rooted at node 305b, the offloading operation costs of child nodes 307b and 308b, as well as the communication cost for node 305b operation, are considered. However, the offloading operation costs for node 307b or node 308b were estimated, the costs have included communication cost for offloading those operations individually to the secondary DBMS. Since the parent node operation 305b is to be offloaded to the secondary DBMS, then the children node operations may be offloaded together and the children node communication costs will not be incurred. Therefore, the communication costs of offloading the children node operations, 307b and 308b, may be subtracted from the total cost of offloading node 305b, and only the communication cost for offloading node 305b operation is included in the total operation cost for offloading.

At block 230, the total cost for offloading the subtree of operations is compared with the total estimated operation cost of executing the subtree of operations on the primary DBMS. If at block 230, the operation cost for the primary DBMS is more than the total offloading cost, then the subtree of operation nodes is denoted to be offloaded to the secondary DBMS at block 235. Otherwise, if the subtree of operations has an offloading total operation cost greater or equal to the total operation cost on the primary DBMS, then the process traverses up the tree to the parent node at block 245. If the process has already evaluated the root node of the tree of operations, and there is no more parent node to which to traverse at block 240, then the process terminates.

In an alternative embodiment, denoted by the dotted line in FIG. 2, if the subtree, rooted at the current node, is evaluated to have greater or equal total cost for offloading to the secondary DBMS, the process may assume that continuing evaluation for offloading may not yield a less costly execution plan. Accordingly, the process may terminate without further evaluating any other parent node subtrees.

Continuing with the evaluation example of the execution plan illustrated in FIG. 3A, FIG. 3B depicts nodes that also include a communication cost for offloading. The estimated operation costs depicted in FIG. 3B for nodes 304b, 305b, 307b and 308b, also include a communication cost of 10 units. Thus, the total estimated cost of node 305b has been determined by adding the communication cost of 10 units; the cost of the "join" operation on the secondary DBMS, 153 units; and the operation costs of the child nodes on the secondary DBMS, 12 and 50 units, respectively; to produce a total of 215 units. However, this total cost also includes the redundant communication costs that has been included in the total cost for the operations at child nodes 307b and 308b. Therefore, to calculate a more precise estimated cost of the "join" operation at node 305b the communication costs of nodes 307b and 308b are subtracted: 10 units each. Accordingly, the total cost of the "join" operation at node 305b is 195 units.

The communication cost between the secondary DBMS and the primary DBMS, even when small, may affect the determination to offload a particular operation. For example, node 304a has an operation cost of 2 units on the primary database. However, on the second database, because of the communication cost of 10 units, the operation cost is approximately 10 units, as depicted at node 304b. Thus, the scan operation on "nation" table described at nodes 304a/304b would not qualify for offloading when communication cost is included but would have qualified for offloading if the communication cost were not included.

According to the estimated total cost of execution with and without offloading (possibly with a communication cost) for an operation, the query optimizer determines whether to denote the operation for an offload to the secondary DBMS. For example, based on the total estimated costs for offloading depicted in node 307b and the total estimated cost on the primary database depicted in node 307a, the query optimizer determines that the table scan operation of the "orders" table is denoted to be executed on the secondary DBMS. Similarly, the table scan operation of the "lineitem" table and "join" operation should be executed on the secondary DBMS based on comparison of the operation costs in nodes 308a, 308b, 305a and 305b, respectively.

Figure 3C:
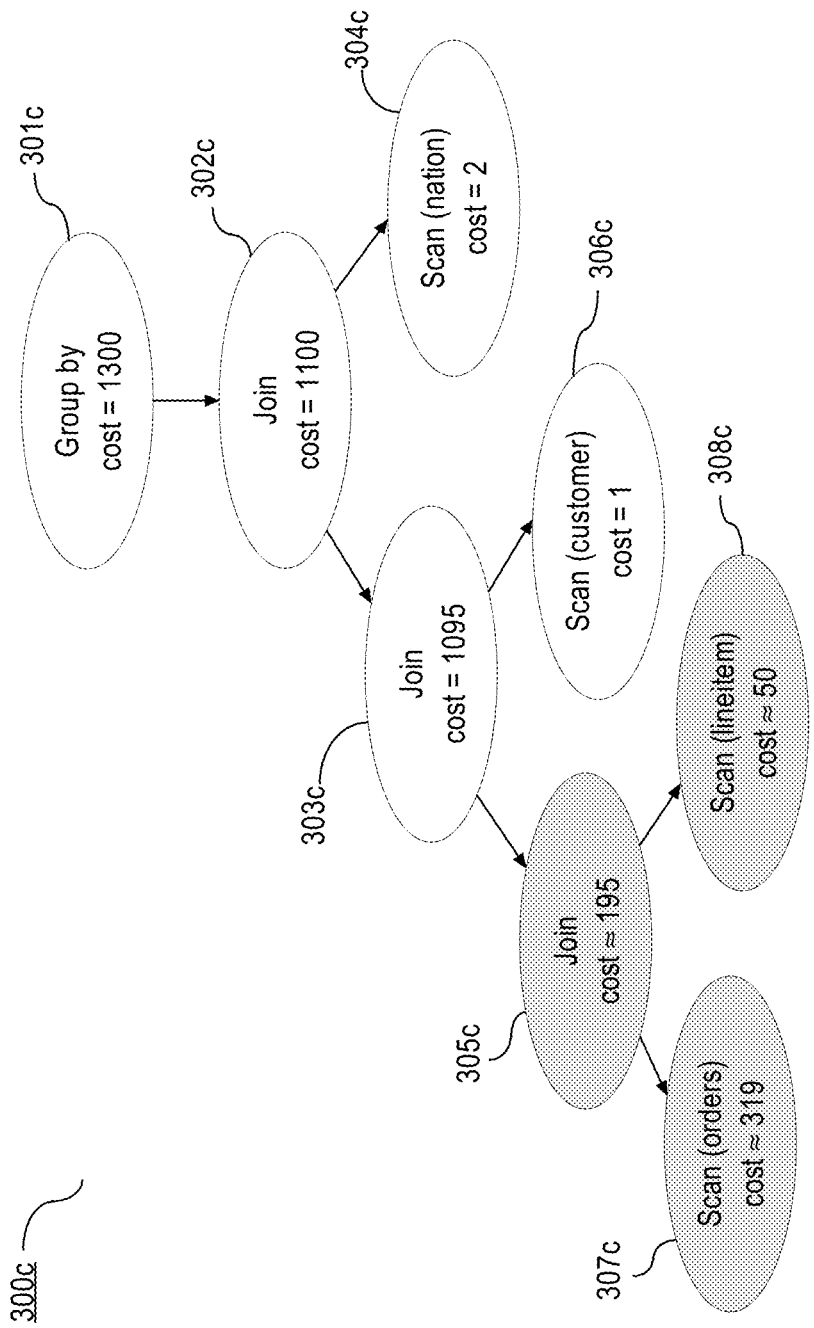
FIG. 3C depicts a graphical representation of a modified execution plan resulting from the execution plan evaluation for offloading a query, in an embodiment.

FIG. 3C illustrates sample tree 300c that combines the execution plan evaluations using the primary and the secondary DBMSs for an execution of sample query 1 into a single execution plan tree depiction, in an embodiment. Shaded nodes 305c, 307c and 308c represent the operations that are determined to be offloaded to the secondary DBMS and have matching operation costs with nodes 305b, 307b and 308b, respectively, in FIG. 3B. Clear nodes 301c, 302c, 303c, 304c and 306c represent the operation costs on the primary DBMS represented by nodes 301a, 302a, 303a, 304a and 306a. However, the operation costs at nodes 301c, 302c and 303c do no match the operation costs 301a, 302a and 303a because those node operation costs have been updated to include the new operation costs from the offloaded child node operations. Particularly, since the offloading saved 32,500 units for the "join" operation at node 305c (as also depicted by comparing the costs at node 305a and 305b, respectively), the total cost for executing example query 1 using the baseline execution plan is reduced from 33,800 units to 1300 units due to offloading operations to the secondary DBMS.

Execution Plan Selection Based on Offloading

In an embodiment, query optimizer 108a may select an execution plan optimized for offloading plan onto secondary DBMS 102b one or more operations of the execution. Query optimizer 108a may generate numerous execution plans for the same query, each execution plan containing a different order of operations or even different type of operations for executing the same query. From the permutation of the generated execution plans, based on various factors such as data/performance statistics, a baseline execution plan may be selected. However, as described in the previous section, the baseline execution plan is only optimized for a particular DBMS. In an embodiment, the query optimizer, may select an execution plan that is optimized for more than one DBMS. To do so, the query optimizer may iterate through permutations of execution plans and evaluate the estimated operation costs of each execution plan based on offloading. The query optimizer may then compare the total estimated operation costs for the evaluated execution plans and select an execution plan with the least estimated cost. The selected execution plan may have one or more operations denoted for offloading to the secondary DBMS.

Figure 4:
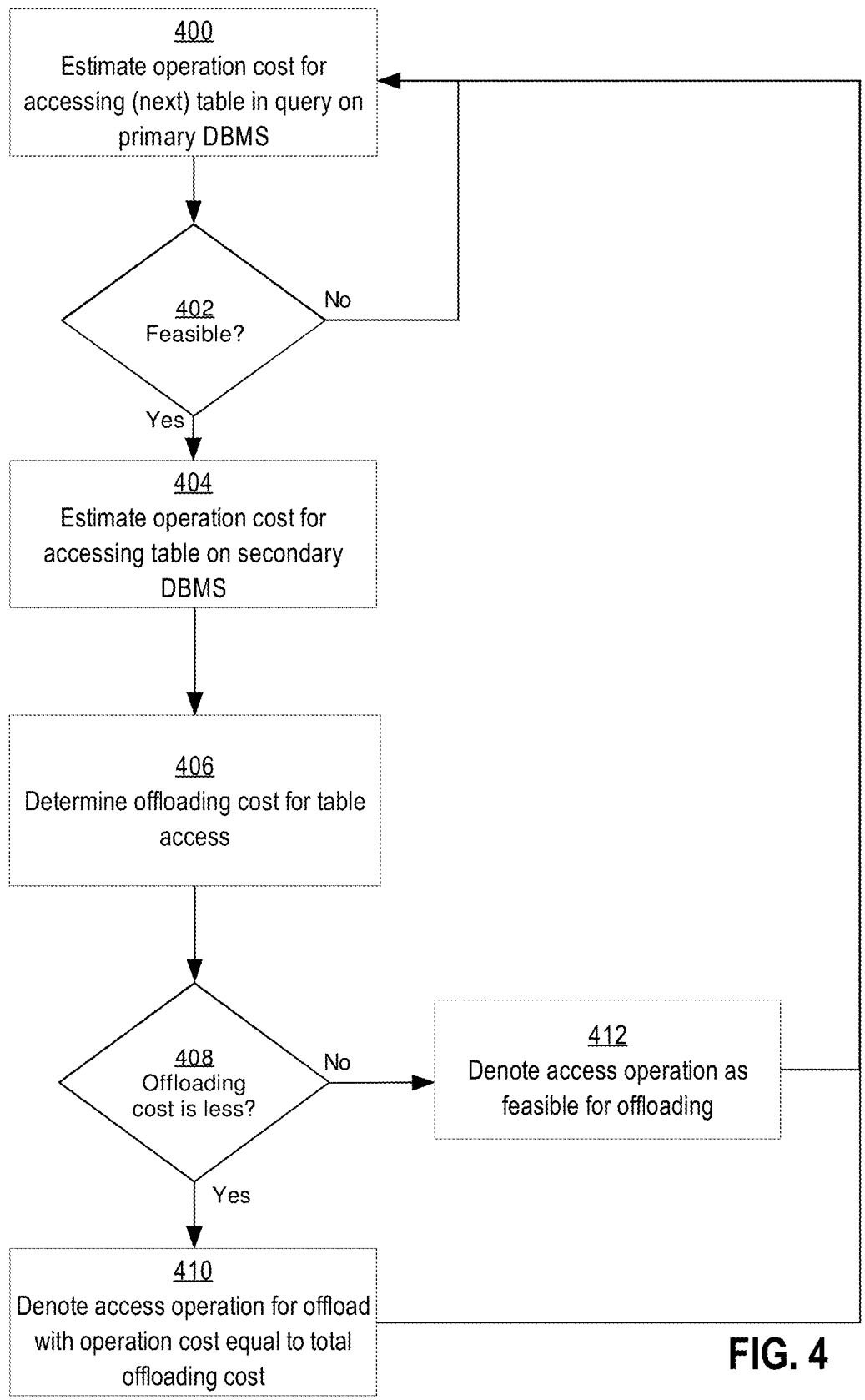
FIG. 4 is a flow diagram that depicts a process of evaluating table access operations on a primary DBMS and a secondary DBMS to determine which operations to denote for offloading to the secondary DBMS, in an embodiment.

In one embodiment, query optimizer 108a first considers which table access operations in a query to offload from primary DBMS 102a to secondary DBMS 102b. FIG. 4 is a flow diagram that depicts a process of evaluating table access operations on the primary DBMS and the secondary DBMS. The process then denotes access operations for offloading to the secondary DBMS based on the evaluation.

At block 400, for a table access operation, such as a scan operation on a particular table in the query, the operation cost is estimated on the primary DBMS. At block 402, the feasibility of the table access operation is determined on the secondary DBMS. If not feasible, then the next table access operation is selected to be evaluated at block 400. If feasible, at block 404, the operation cost for the table access operation on the secondary DBMS is estimated.

The total cost for offloading the table access operation to the secondary DBMS is calculated by estimating the communication cost for the operation and adding the communication cost to the operation cost on the secondary DBMS at block 406, in an embodiment. At block 408, the total offloading operation cost is compared with the table access operation cost on the primary DBMS. If the operation cost with offloading is less, then, at block 410, the table access operation is denoted for offloading and the total cost of the table access is assigned to be the total cost of offloading the operation. Otherwise, if the offloading cost is greater than or equal to the cost on the primary DBMS, the offloading cost information for the table access operation is retained for further evaluation of operations that may use the table access operation as an input. In this case, rather than denoting the table access operation for offloading, the table access operation is denoted as feasible for offloading at block 412. The process then continues to evaluate the next table access operation in the query.

In an embodiment, query optimizer 108a may evaluate different join orders, where each join order makes up a part of an execution plan for a query. Each join order has a specific order of join operations, from the most nested join operation that operates on tables, to the most high level join operation that outputs the result set of the join order. The join orders are evaluated for their total cost that may include offloading one or more join operations to secondary DBMS 102b, in some embodiments. The join order with the least cost is selected for the execution plan of the query.

Figure 5:
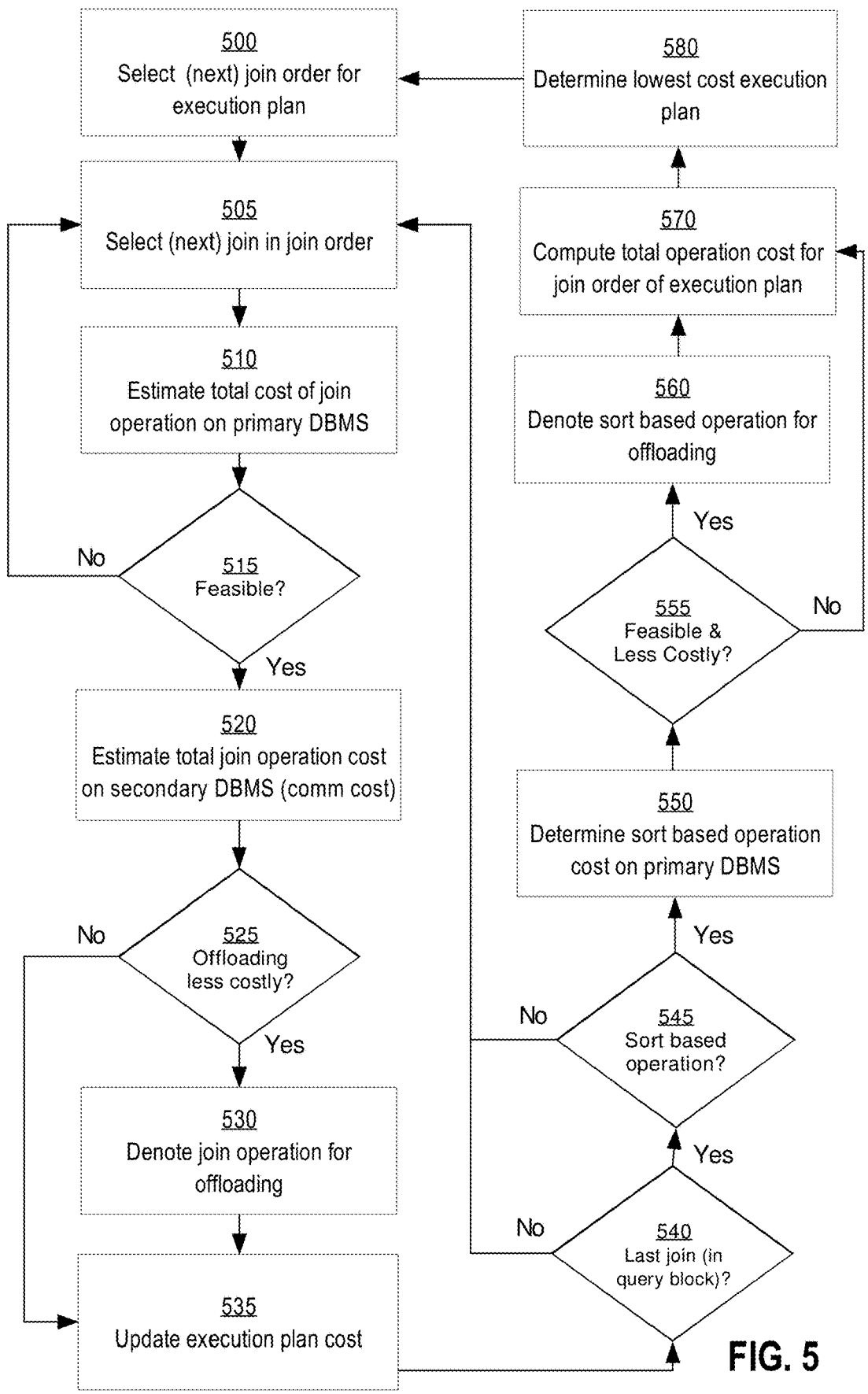
FIG. 5 is a flow diagram that depicts a process for evaluation execution plans with different join orders for offloading to a secondary DBMS, in an embodiment.
Figure 6A:
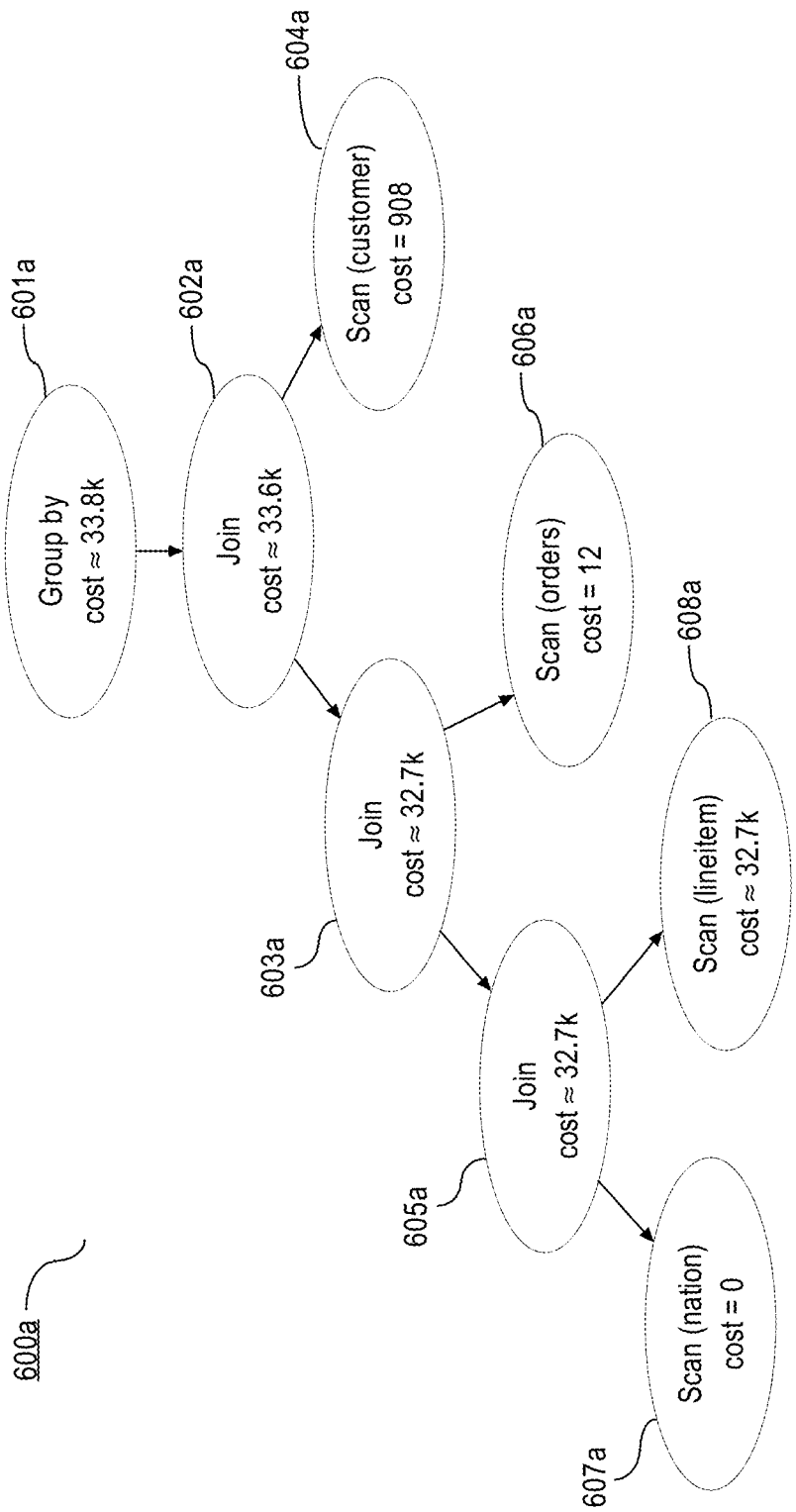
FIG. 6A depicts a graphical representation of a query execution plan with a different join order, in an embodiment.

FIG. 5 is a flow diagram that depicts a process for evaluation execution plans with different join orders, in an embodiment. At block 500, an execution plan that contains a particular join order is selected. For example, each of the figures, FIG. 3A and FIG. 6A, are instances of example query 1 execution plans that contain different join orders. The figures depict the various execution plans as trees of operation nodes, with lower operation nodes to be executed first. Accordingly, in the FIG. 3A join order, the first join operation, node 305a, is a join operation on "orders" table and "lineitem" table. On the other hand, in the FIG. 6A join order, the first join operation, node 605a, is a different join operation, joining "nation" table and "lineitem" table. Using FIGS. 3A and 6A as an example, at block 500, one of the execution plan trees in the figures is selected for an evaluation for offloading from primary DBMS 102a to secondary DBMS 102b.

At block 505, the first or next join operation is selected for evaluation for offloading based on its position in the join order. At block 510, the join operation's cost is estimated on the primary DBMS. The join operation's cost also includes the cost for accessing the tables necessary for the join operation, which may be determined using techniques described in FIG. 4. In the example of FIG. 3A, node 305a's join operation is estimated on the first DBMS to be 32,700 units as depicted within node 305a. At block 515, the selected join operation is evaluated for feasibility on the secondary DBMS. If, feasible, then, at block 520, the offloading cost is estimated for the join operation on the secondary DBMS. The offloading costs also includes the operation costs for accessing tables necessary for the join operation that may be estimated using techniques in FIG. 4. In some embodiments, the cost may also include the communication cost for offloading the join operation.

Continuing with the example of FIG. 3A, the query optimizer of the primary DBMS requests from the secondary DBMS the estimates of operation cost for the join operation on tables "orders" and "lineitem". The query optimizer may also estimate the communication cost for possibly transferring the results of the join operation from the secondary DBMS to the primary DBMS, in an embodiment. Node 305b, in FIG. 3B, illustrates the total offloading cost for node 305a, as previously described.

At block 525, the estimated cost for offloading the operation is compared with the estimated cost of operation on the primary DBMS. If the offloading cost is less, then at block 530 the join operation is denoted for offloading to the secondary DBMS. At block 535, the total cost of the particular join order execution plan is updated with the estimated join operation cost. The process may then transition to evaluate the next join operation at block 505 until all the join operations in the join order are evaluated as determined at block 540. If, at block 545, the last join operation has been evaluated and is followed by a sort or group operation, then the feasibility and cost of the group or sort operation is evaluated at block 555. If the group or sort operation is feasible to upload on to the secondary DBMS and costs less than estimated at block 550 for the primary DBMS, then the sort or group operation is denoted for offloading at block 560.

At block 570, the total operation cost for the particular join order execution plan is computed. Per the evaluations of join and other operations within the execution plan, the execution plan may contain one or more operations that are denoted for offloading. FIG. 3C, as discussed above, depicts an example of execution plan with offloading denoted operation nodes shaded. The total cost of the execution plan in FIG. 3C 1300 units, as shown within the root node, node 301*c*. At block 580, the query optimizer determines whether the selected execution plan cost is the lowest from the previously evaluated execution plans. Then, the process transition to block 500 to evaluate the next join order for another execution plan permutation until all the permutations of join orders are evaluated, and an execution plan optimized for offloading with the least cost is selected.

Figure 6B:
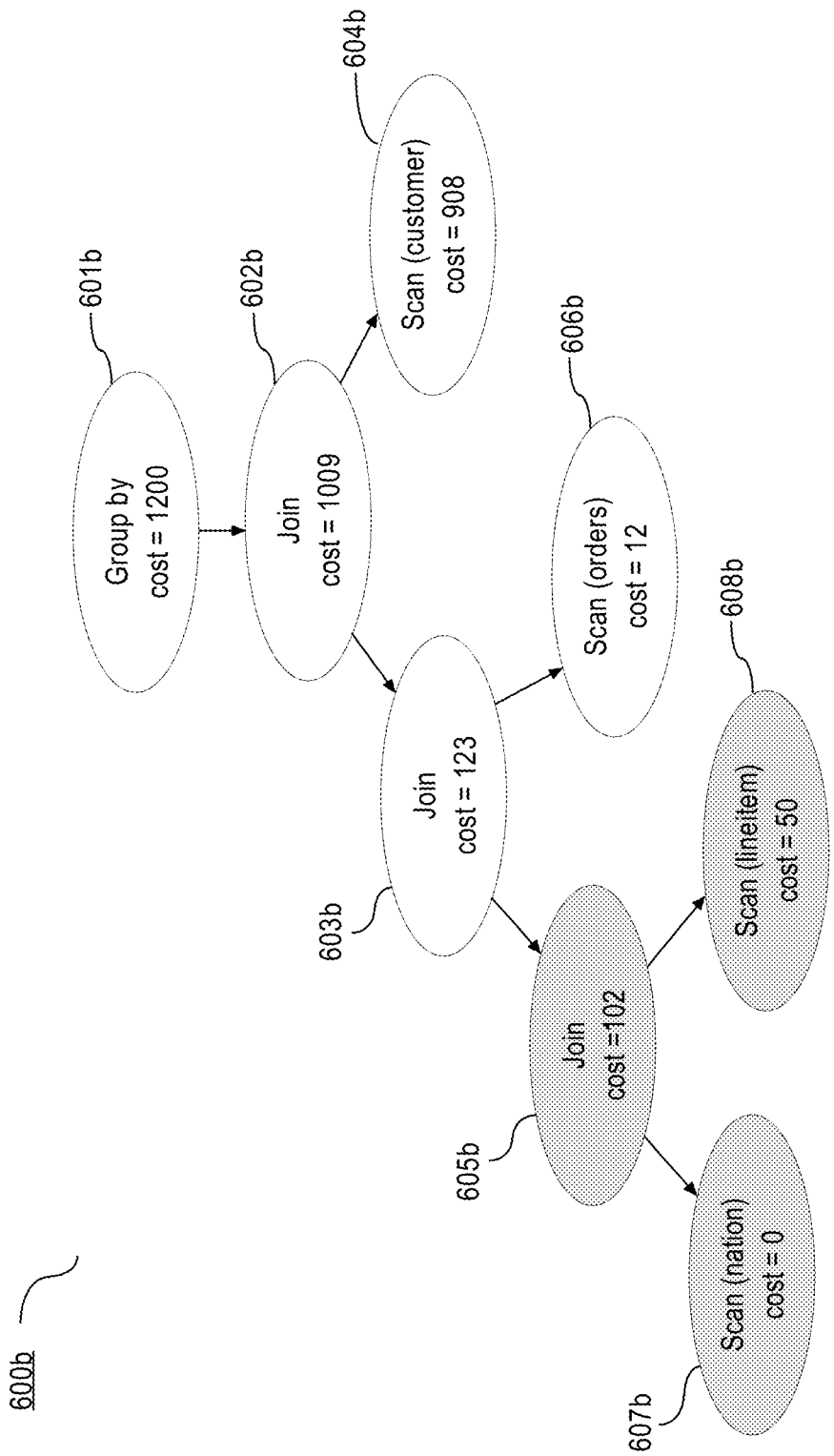
FIG. 6B depicts a graphical representation of the query execution plan of FIG. 6A evaluated for offloading operations to a secondary DBMS, in an embodiment.

For example, the process may then evaluate a join order permutation depicted in FIG. 6A's tree 600*a*. At block 570, the evaluation would yield an execution plan depicted in FIG. 6B's tree 600*b*. The shaded nodes represent the operations denoted for offloading to the secondary DBMS, and the root node, node 601*b*, displays the total estimated cost for the execution plan with the depicted join order. At block 580, the total cost at node 601*b*, is compared with the previously evaluated execution plan, such as the execution plan depicted in FIG. 3C. Accordingly, the node 601*b* total estimated operation cost of 1200 units is compared with the node 301*c* total estimated operation cost of 1300 units. Since, the FIG. 6B execution plan for example query 1 is less than FIG. 3C execution plan for the query, the query optimizer selects the execution plan described by FIG. 6B for example query 1.

In an embodiment, multiple types of join or scan operations may be evaluated for offloading using the techniques described herein. If secondary DBMS 102*b* supports multiple types of scan or join operations, then the offloading cost for those operation may also be considered in the evaluation of a particular execution plan for offloading. Considering more than one join or scan operation type may increase the number of permutations of execution plans for a query, however may further decrease the estimated operation cost for the query, in some embodiments.

For example, a particular type of join or scan operations may generate the same row order as required by a sort based operation in the execution plan, such as a group or sort operation, thus significantly reducing the cost of the sort based operation and perhaps, the overall cost of the execution. In some cases, an execution plan that have a more costly type of join or scan operation, may be estimated to be less costly than another execution plan with less costly type of join or scan operation because of the savings for the sort or group operation in the execution plan. In some embodiments, a sort-merge join operation, a nested-loop join operation, or an index scan operation may yield the same row order as a group or sort operation and thus, may help to eliminate the cost of performing the sort based operation. Thus, if such execution plan is evaluated, the execution plan may be determined to be the least costly execution plan with offloading.

Other techniques for evaluating execution plans with offloading for a query are envisioned based on combination of embodiments described herein. For example, although, the techniques described in flow diagrams of FIGS. 4 and 5 evaluate table access operations separate from join operations, in other embodiments, query optimizer 108*a* may evaluate the table access operations and join order permutations concurrently. A particular table access operation may be evaluated as part of the evaluation of a particular join operation in a particular join order. Once evaluated, the results of the evaluation for the particular table access operation may be reused in subsequent evaluations of other join orders.

Database Management Systems

A database management system (DBMS), such as primary DBMS 102*a* or secondary DBMS 102*b* described herein, manages a database. A DBMS may comprise one or more database servers such as primary database server 104*a* and secondary database server 104*b* that are described in FIG. 1. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the approach are described herein using the term "SQL", the approach is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
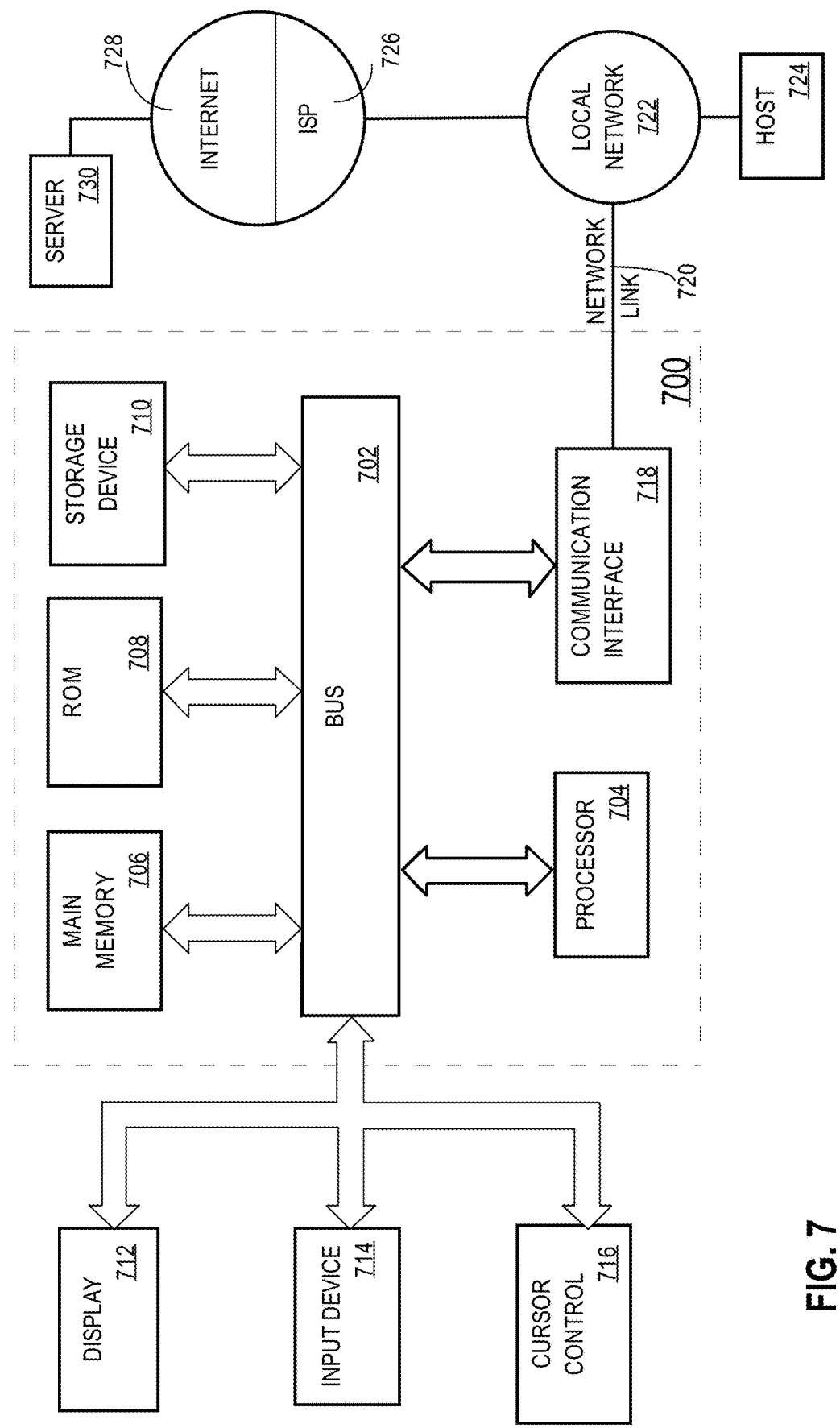
FIG. 7 is a block diagram illustrating a computer system that may be used to implement the techniques described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Cloud Computing Overview

The techniques described herein are implemented using one or more processing solutions, examples of which include distributed systems, clustered computing systems, and cloud computing systems. In an embodiment, primary DBMS 102a or secondary DBMS 102b is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to primary DBMS 102a or secondary DBMS 102b, or to other entities within this description, is controllable via an interface that is exposed at a cloud computing system.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A method comprising:
   a first database management system (DBMS) storing a first copy of particular data, and a second DBMS storing a second copy of the same particular data;
   receiving a query to execute at the first DBMS, the query referencing the particular data;
   estimating an initial operation cost of an operation of a plurality of operations in an execution plan of the query on the first DBMS, wherein the execution plan is represented by a tree of nodes, each node representing a corresponding operation of the execution plan and each subtree of nodes, of the tree of nodes, representing particular operations on which a particular operation at a root node of said each subtree of nodes depends;
   wherein estimating the initial operation cost of the operation for the first DBMS includes a first operation cost for a subtree of the operation in the first DBMS and is based at least on the operation accessing the first copy of the particular data already available on the first DBMS prior to the receiving of the query;
   determining feasibility to execute the operation on the second DBMS at least by determining that the second copy of the particular data is already stored in the second DBMS, wherein the operation is considered feasible if a) the particular data that the operation accesses is stored on the second DBMS, and b) the operation is supported by the second DBMS;
   based on determining the feasibility, estimating an operation cost to execute the operation of the execution plan of the query on the second DBMS;
   wherein estimating the operation cost of the operation for the second DBMS includes a second operation cost for the subtree of the operation in the second DBMS and is based at least on the operation accessing the second copy of the particular data already available on the second DBMS prior to the receiving of the query;
   wherein the operation cost includes communication cost for parent and child node operations of the subtree of the operation in the second DBMS;
   wherein the second DBMS is heterogeneous from the first DBMS;
   comparing the operation cost of executing the subtree of the operation on the second DBMS with the initial operation cost of executing the subtree of the operation on the first DBMS thereby identifying whether to offload the operation of the execution plan to the second DBMS;

executing the query at least in part by executing the operation on either the first DBMS or the second DBMS to generate result data;

wherein the method is performed by one or more computing devices.

2. The method of claim 1, further comprising:
when the operation cost is less than the initial operation cost, then identifying the operation for offloading to the second DBMS.

3. The method of claim 1, wherein the operation cost includes a cost of communication between the first DBMS and the second DBMS.

4. The method of claim 1, further comprising:
generating the execution plan, for the query, that comprises a first set of operations;
generating a second execution plan, for the query, that is different from the execution plan and comprises a second set of operations;
estimating, for each operation in the first set of operations of the execution plan, a first operation cost of executing said each operation in the first set of operations at the first DBMS and a second operation cost of execution said each operation in the first set of operations at the second DBMS;
estimating a first plan operation cost for the execution plan based on a lesser of the first operation cost and the second operation cost;
estimating, for each operation in the second set of operations of the second execution plan, a third operation cost of executing said each operation in the second set of operations at the first DBMS and a fourth operation cost of execution said each operation in the second set of operations at the second DBMS;
estimating a second plan operation cost for the second execution plan based on a lesser of the third operation cost and the fourth operation cost;
selecting the execution plan for executing the query, when the first plan operation cost is less than the second plan operation cost.

5. The method of claim 4, wherein the execution plan comprises a different join operation order than the second execution plan.

6. The method of claim 4, wherein the execution plan comprises of a different type of operation than the second execution plan.

7. The method of claim 6, wherein the different type of operation has a same row order as a sort based operation of the execution plan.

8. The method of claim 1, wherein the second DBMS comprises a copy of a subset of data tables included in the first DBMS.

9. The method of claim 1, wherein the first DBMS and the second DBMS comprise different hardware architecture.

10. The method of claim 1, wherein the first DBMS stores the first copy of the particular data in a first storage format, and the second DBMS stores the second copy of the particular data in a second storage format different from the first storage format.

11. The method of claim 10, wherein the first storage format is a column-major format and the second storage format is a row-major format.

12. The method of claim 1, wherein the first DBMS stores the first copy of the particular data according to a first database schema, and the second DBMS stores the second copy of the particular data according to a second database schema different from the first database schema.

13. The method of claim 1, wherein the second DBMS is heterogeneous from the first DBMS based on different DBMS architecture.

14. The method of claim 1, wherein the different DBMS architecture includes one or more: different storage architecture, different capability hardware components, different revision, model and/or vendor for DBMS software.

15. One or more non-transitory storage media storing a set of instructions which, when executed by one or more processors, causes:

a first database management system (DBMS) storing a first copy of particular data, and a second DBMS storing a second copy of the same particular data;

receiving a query to execute at the first DBMS, the query referencing the particular data;

estimating an initial operation cost of an operation of a plurality of operations in an execution plan of the query on the first DBMS, wherein the execution plan is represented by a tree of nodes, each node representing a corresponding operation of the execution plan and each subtree of nodes, of the tree of nodes, representing particular operations on which a particular operation at a root node of said each subtree of nodes depends;

wherein estimating the initial operation cost of the operation for the first DBMS includes a first operation cost for a subtree of the operation in the first DBMS and is based at least on the operation accessing the first copy of the particular data already available on the first DBMS prior to the receiving of the query;

determining feasibility to execute the operation on the second database management system DBMS at least by determining that the second copy of the particular data is already stored in the second DBMS, wherein the operation is considered feasible if a) the particular data that the operation accesses is stored on the second DBMS, and b) the operation is supported by the second DBMS;

based on determining the feasibility, estimating an operation cost to execute the operation of the execution plan of the query on the second DBMS;

wherein estimating the operation cost of the operation for the second DBMS includes a second operation cost for the subtree of the operation in the second DBMS and is based at least on the operation accessing the second copy of the particular data already available on the second DBMS prior to the receiving of the query;

wherein the operation cost includes communication cost for parent and child node operations of the subtree of the operation in the second DBMS;

wherein the second DBMS is heterogeneous from the first DBMS;

comparing the operation cost of executing the subtree of the operation on the second DBMS with the initial operation cost of executing the subtree of the operation on the first DBMS thereby identifying whether to offload the operation of the execution plan to the second DBMS;

executing the query at least in part by executing the operation on either the first DBMS or the second DBMS to generate result data.

16. The non-transitory storage media of claim 15, wherein the set of instructions include instructions which, when executed by the one or more processors, cause:

when the operation cost is less than the initial operation cost, then identifying the operation for offloading to the second DBMS.

17. The non-transitory storage media of claim 15, wherein the operation cost includes a cost of communication between the first DBMS and the second DBMS.

18. The non-transitory storage media of claim 15, wherein the set of instructions include instructions which, when executed by the one or more processors, cause:
generating the execution plan, for the query, that comprises a first set of operations;
generating a second execution plan, for the query, that is different from the execution plan and comprises a second set of operations;
estimating, for each operation in the first set of operations of the execution plan, a first operation cost of executing said each operation in the first set of operations at the first DBMS and a second operation cost of execution said each operation in the first set of operations at the second DBMS;
estimating a first plan operation cost for the execution plan based on a lesser of the first operation cost and the second operation cost;
estimating, for each operation in the second set of operations of the second execution plan, a third operation cost of executing said each operation in the second set of operations at the first DBMS and a fourth operation cost of execution said each operation in the second set of operations at the second DBMS;
estimating a second plan operation cost for the second execution plan based on a lesser of the third operation cost and the fourth operation cost;
selecting the execution plan for executing the query, when the first plan operation cost is less than the second plan operation cost.

19. The non-transitory storage media of claim 18, wherein the execution plan comprises a different join operation order than the second execution plan.

20. The non-transitory storage media of claim 18, wherein the execution plan comprises of a different type of operation than the second execution plan.

21. The non-transitory storage media of claim 20, wherein the different type of operation has a same row order as a sort based operation of the execution plan.

22. The non-transitory storage media of claim 15, wherein the second DBMS comprises a copy of a subset of data tables included in the first DBMS.

23. The non-transitory storage media of claim 15, wherein the first DBMS and the second DBMS comprise different hardware architecture.

24. The non-transitory storage media of claim 15, wherein the first DBMS stores the first copy of the particular data in a first storage format, and the second DBMS stores the second copy of the particular data in a second storage format different from the first storage format.

25. The non-transitory storage media of claim 24, wherein the first storage format ia a column-major format and the second storage format is a row-major format.

26. The non-transitory storage media of claim 15, wherein the first DBMS stores the first copy of the particular data according to a first database schema, and the second DBMS stores the second copy of the particular data according to a second database schema different from the first database schema.

27. The non-transitory storage media of claim 15, wherein the second DBMS is heterogeneous from the first DBMS baes on different DBMS architecture.

28. The non-transitory storage media of claim 15, wherein the different DBMS architecture includes one or more: different storage architecture, different capability hardware components, different revision, model and/or vendor DBMS software.

* * * * *

UNITED STATES PATENT AND TRADEMARK OFFICE
CERTIFICATE OF CORRECTION

PATENT NO. : 10,585,887 B2
APPLICATION NO. : 14/673560
DATED : March 10, 2020
INVENTOR(S) : Tran et al.

Page 1 of 1

It is certified that error appears in the above-identified patent and that said Letters Patent is hereby corrected as shown below:

In the Claims

In Column 22, Line 35, in Claim 15, after "second" delete "database management system".

In Column 24, Line 21, in Claim 25, delete "ia" and insert -- is --, therefor.

In Column 24, Line 31, in Claim 27, delete "baes" and insert -- based --, therefor.

In Column 24, Line 36, in Claim 28, after "vendor" insert -- for --.

Signed and Sealed this
Twenty-seventh Day of October, 2020

Andrei Iancu
*Director of the United States Patent and Trademark Office*